(No Model.)
G. W. WALTON.
WAGON BRAKE.
No. 434,573.  Patented Aug. 19, 1890.
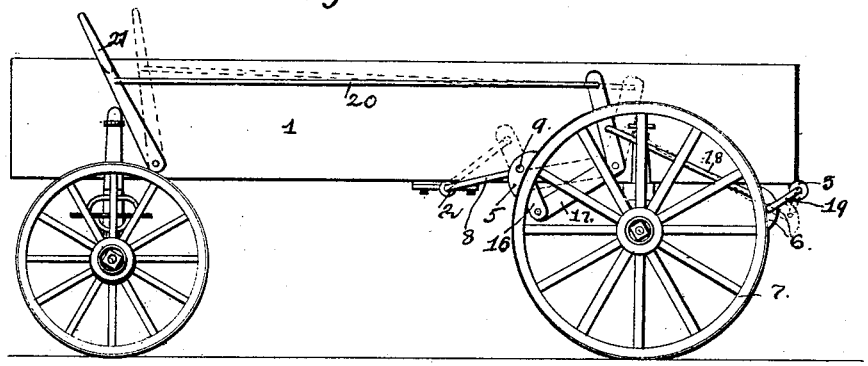
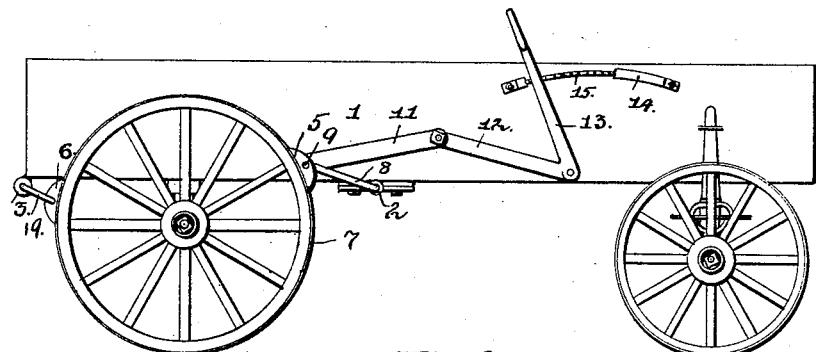
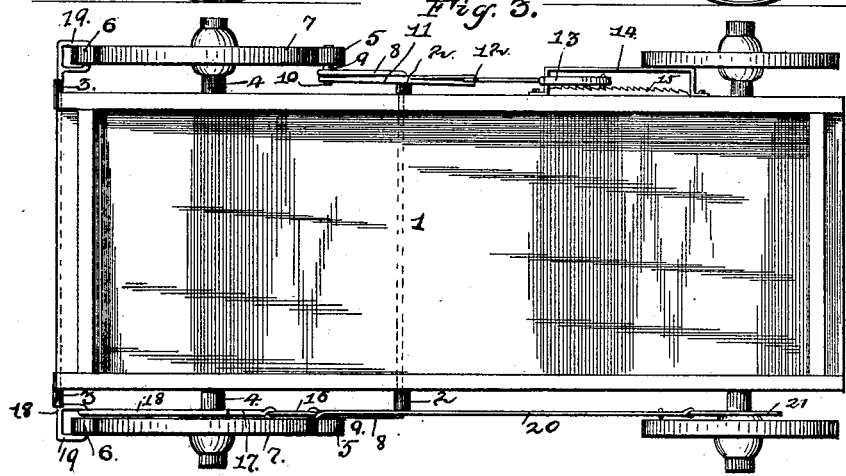
Witnesses  Inventor
George W. Walton
By his Attorneys,

UNITED STATES PATENT OFFICE.

GEORGE WASHINGTON WALTON, OF SPARTA, TEXAS.

WAGON-BRAKE.

SPECIFICATION forming part of Letters Patent No. 434,573, dated August 19, 1890.

Application filed May 31, 1890. Serial No. 353,773. (No model.)

*To all whom it may concern:*

Be it known that I, GEORGE WASHINGTON WALTON, a citizen of the United States, residing at Sparta, in the county of Bell and State of Texas, have invented a new and useful Wagon-Brake, of which the following is a specification.

The invention relates to improvements in wagon-brakes.

The object of the present invention is to provide a simple, strong, and effective brake adapted to securely clamp the rear wheels of the vehicle upon their front and rear sides and to prevent strain upon the spindles.

The invention consists in the improved construction, arrangement, and combination of parts hereinafter fully described, illustrated in the accompanying drawings, and pointed out in the claims hereto appended.

In the drawings, Figure 1 is a side elevation of a wagon provided with a brake constructed in accordance with this invention. Fig. 2 is a side elevation of the opposite side. Fig. 3 is a plan view.

Referring to the accompanying drawings, 1 designates a vehicle-body, which is provided with rock-shafts 2 and 3, arranged upon each side of the rear axle 4 and provided with brake-blocks 5 and 6, adapted to engage the wheel 7 at the front and rear with equal pressure, and thereby prevent strain upon the spindles. The rock-shaft 2, which is journaled in suitable bearings in front of the wheel, is provided at its ends with crank-arms 8, to the horizontal portions 9 of which are pivoted the brake-blocks 5, which may be of any desired construction, and the arm upon one side of the vehicle is provided with the inward lateral projection 10, to which is pivoted a bar 11, which has its opposite end bifurcated and pivoted to an arm 12 of an operating-lever 13. The arm 12 of the lever is formed integral therewith, and the lever is fulcrumed at the lower edge of the adjacent side, and the upper portion of the lever is arranged in a guide 14, and is adapted to engage a rack-bar 15, having its teeth shouldered in one direction to hold the brake-block into contact with the wheel. The arm 8 at the other side of the wagon is connected by a bar 16 with one arm of a bell-crank lever 17, fulcrumed on the wagon-body, and having its other arm connected with the rear rock-shaft 3 by a rod 18, which has its rear end secured to loops 19 at the ends of the rear rock-shaft, and the front end of the rod is pivotally connected to the arm of the rock-shaft about midway the length of the arm. The end of said arm is connected by a rod 20 with an operating-lever 21, which is preferably provided with a rack-bar and guard similar to the lever 13. The brake-blocks and the arms of the rock-shaft may be of any desirable construction, and the former are arranged above and below the axle and securely clamp the wheel with sufficient force to stop the vehicle upon any road.

It will readily be seen that the brake mechanism herein shown and described is simple and inexpensive in construction, strong and durable, and adapted to be readily applied to a vehicle.

From the foregoing description and the accompanying drawings the construction, operation, and advantages of the invention will be readily understood.

Having thus described my invention, I claim—

1. The combination, with the vehicle, of the rock-shafts arranged upon opposite sides of the rear axle and provided with brake-blocks adapted to engage the front and rear of the wheel, the bell-crank lever fulcrumed at its angle on the body and arranged between the rock-shaft, and having one arm extending downward and connected with the arm of the front rock-shaft and its other arm extending upward, the rod 18, connecting the upwardly-extending arm of the bell-crank lever with the arm of the rear rock-shaft, and the operating-lever, substantially as described.

2. The combination, with the vehicle, of the rock-shaft arranged upon opposite sides of the rear wheels, the bell-crank lever fulcrumed on the body between said shaft, the rod connecting the rear shaft and one arm of said lever, the bar pivoted to the other arm of the lever and the front rock-shaft, and the operating-lever 13, provided with the integral arm arranged at an angle to the lever and connected with the front rock-shaft, substantially as described.

In testimony that I claim the foregoing as my own I have hereto affixed my signature in presence of two witnesses.

GEORGE WASHINGTON WALTON.

Witnesses:
J. P. REED,
H. A. WEAR.